United States Patent
Corkum et al.

(10) Patent No.: US 10,265,863 B2
(45) Date of Patent: Apr. 23, 2019

(54) RECONFIGURABLE ROBOTIC SYSTEM AND METHODS

(71) Applicant: Carbon Robotics, Inc., San Francisco, CA (US)

(72) Inventors: Daniel Corkum, San Francisco, CA (US); Rosanna Myers, San Francisco, CA (US)

(73) Assignee: Carbon Robotics, Inc., San Francisco, CA (US)

( * ) Notice: Subject to any disclaimer, the term of this patent is extended or adjusted under 35 U.S.C. 154(b) by 142 days.

(21) Appl. No.: 15/260,407

(22) Filed: Sep. 9, 2016

(65) Prior Publication Data

US 2017/0066139 A1    Mar. 9, 2017

Related U.S. Application Data

(60) Provisional application No. 62/216,325, filed on Sep. 9, 2015.

(51) Int. Cl.
  *B25J 15/00* (2006.01)
  *B25J 15/04* (2006.01)

(52) U.S. Cl.
  CPC ....... *B25J 15/0066* (2013.01); *B25J 15/0019* (2013.01); *B25J 15/0408* (2013.01)

(58) Field of Classification Search
  USPC .................................................. 700/245–264
  See application file for complete search history.

(56) References Cited

U.S. PATENT DOCUMENTS

| | | | | |
|---|---|---|---|---|
| 4,604,787 A * | 8/1986 | Silvers, Jr. | ......... | B23Q 3/15526 29/26 A |
| 6,120,433 A * | 9/2000 | Mizuno | .................. | A61B 34/70 600/102 |
| 6,434,507 B1 * | 8/2002 | Clayton | ........... | A61B 17/32002 600/104 |
| 6,442,444 B2 * | 8/2002 | Matsubara | ........... | G05B 19/414 700/245 |
| 6,645,196 B1 * | 11/2003 | Nixon | .................... | B25J 9/1664 128/898 |
| 7,386,163 B2 * | 6/2008 | Sabe | .................. | G06K 9/00664 348/118 |
| 7,883,458 B2 * | 2/2011 | Hamel | ............. | A61B 17/32002 600/1 |

(Continued)

*Primary Examiner* — Jonathan L Sample
(74) *Attorney, Agent, or Firm* — Run8 Patent Group, LLC; Peter Miller

(57) ABSTRACT

One variation of a reconfigurable robotic system includes: a base; an arm extending from the base, including a set of articulable axes, and terminating at a head interface board defining a set of interface pins; a component interconnect arranged within the base, including a set of interconnect pins electrically coupled to the set of interface pins, and including a set of logic pins; a control card configured to transiently engage the component interconnect and including: a set of interconnect pads configured to contact the set of interconnect pins, a set of logic pads configured to contact the set of logic pins, and a control circuit interposed between the set of interconnect pads and the set of logic pads and including a set of independently selectable function circuits between each interconnect pad in a subset of the set of interconnect pads and corresponding logic pads in the set of logic pads.

20 Claims, 3 Drawing Sheets

(56) References Cited

U.S. PATENT DOCUMENTS

| | | | | |
|---|---|---|---|---|
| 8,135,128 B2* | 3/2012 | Marti | ................. | H04M 1/642 |
| | | | | 379/142.15 |
| 8,250,343 B2* | 8/2012 | Chandhoke | ........... | G06F 9/5066 |
| | | | | 700/249 |
| 8,357,144 B2* | 1/2013 | Whitman | ........... | A61B 10/0233 |
| | | | | 128/898 |
| 8,423,182 B2* | 4/2013 | Robinson | ........... | A61B 18/1206 |
| | | | | 700/245 |
| 8,672,837 B2* | 3/2014 | Roelle | ................ | A61B 1/00006 |
| | | | | 600/118 |
| 9,763,741 B2* | 9/2017 | Alvarez | ................ | G16H 40/63 |
| 2002/0032452 A1* | 3/2002 | Tierney | ................ | G06Q 30/02 |
| | | | | 606/130 |
| 2004/0153211 A1* | 8/2004 | Kamoto | ................ | A63H 11/00 |
| | | | | 700/245 |
| 2006/0106493 A1* | 5/2006 | Niemeyer | ............ | A61B 34/70 |
| | | | | 700/245 |
| 2007/0043958 A1* | 2/2007 | Sasaki | ................ | G06F 21/78 |
| | | | | 713/194 |
| 2007/0073439 A1* | 3/2007 | Habibi | ................ | B25J 9/1697 |
| | | | | 700/213 |
| 2007/0299427 A1* | 12/2007 | Yeung | .................. | B25J 9/047 |
| | | | | 606/1 |
| 2008/0046122 A1* | 2/2008 | Manzo | ............ | A61B 1/00149 |
| | | | | 700/245 |
| 2008/0200794 A1* | 8/2008 | Teichman | ............ | A61B 90/39 |
| | | | | 600/407 |
| 2009/0076476 A1* | 3/2009 | Barbagli | ............ | A61B 5/1076 |
| | | | | 604/500 |
| 2009/0163929 A1* | 6/2009 | Yeung | ................. | B25J 9/047 |
| | | | | 606/130 |
| 2010/0157546 A1* | 6/2010 | Reimund | ............ | H05K 7/1435 |
| | | | | 361/729 |
| 2010/0228264 A1* | 9/2010 | Robinson | ........... | A61B 18/1206 |
| | | | | 606/130 |
| 2010/0228588 A1* | 9/2010 | Nielsen | ................. | G06Q 10/06 |
| | | | | 705/7.11 |
| 2011/0049231 A1* | 3/2011 | Lin | ................. | G01D 18/00 |
| | | | | 235/375 |
| 2011/0082452 A1* | 4/2011 | Melsky | ................ | A61B 18/24 |
| | | | | 606/15 |
| 2011/0129804 A1* | 6/2011 | Choi | ................ | A63H 17/395 |
| | | | | 434/118 |
| 2011/0295248 A1* | 12/2011 | Wallace | ................ | B25J 9/1689 |
| | | | | 606/33 |
| 2011/0319714 A1* | 12/2011 | Roelle | ............ | A61B 1/00006 |
| | | | | 600/118 |
| 2011/0319815 A1* | 12/2011 | Roelle | ............ | A61B 1/00149 |
| | | | | 604/95.01 |
| 2013/0031509 A1* | 1/2013 | Curtis | ................ | G06F 17/5077 |
| | | | | 715/810 |
| 2014/0180310 A1* | 6/2014 | Blumenkranz | ........ | G06Q 30/02 |
| | | | | 606/130 |
| 2014/0276950 A1* | 9/2014 | Smaby | ................ | A61B 34/30 |
| | | | | 606/130 |
| 2015/0343635 A1* | 12/2015 | Linnell | ................ | B25J 9/1671 |
| | | | | 700/249 |
| 2016/0309590 A1* | 10/2016 | Ding | ................ | G06F 1/1613 |

* cited by examiner

US 10,265,863 B2

RECONFIGURABLE ROBOTIC SYSTEM AND METHODS

CROSS-REFERENCE TO RELATED APPLICATIONS

This Application claims the benefit of U.S. Provisional Application No. 62/216,325, filed on 9 Sep. 2015, which is incorporated in its entirety by this reference.

TECHNICAL FIELD

This invention relates generally to the field of robotics and more specifically to a new and useful reconfigurable robotic system in the field of robotics.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Reconfigurable Robotic System

Figure 1:
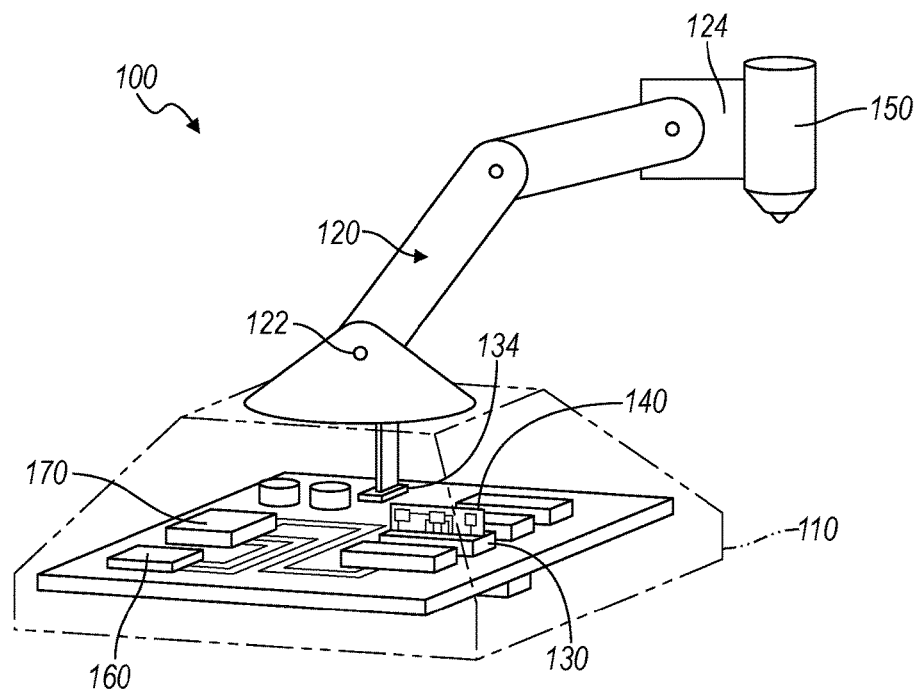
FIG. 1 is a schematic representation of a reconfigurable robotic system.
Figure 2:
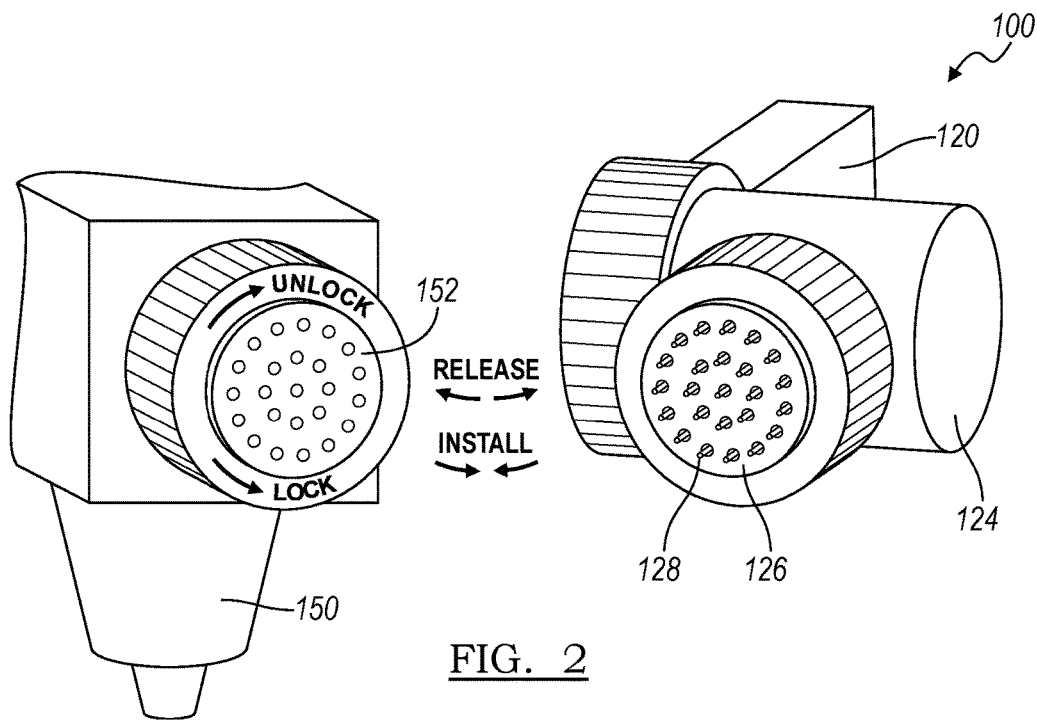
FIG. 2 is a schematic representation of one variation of the reconfigurable robotic system.
Figure 3:
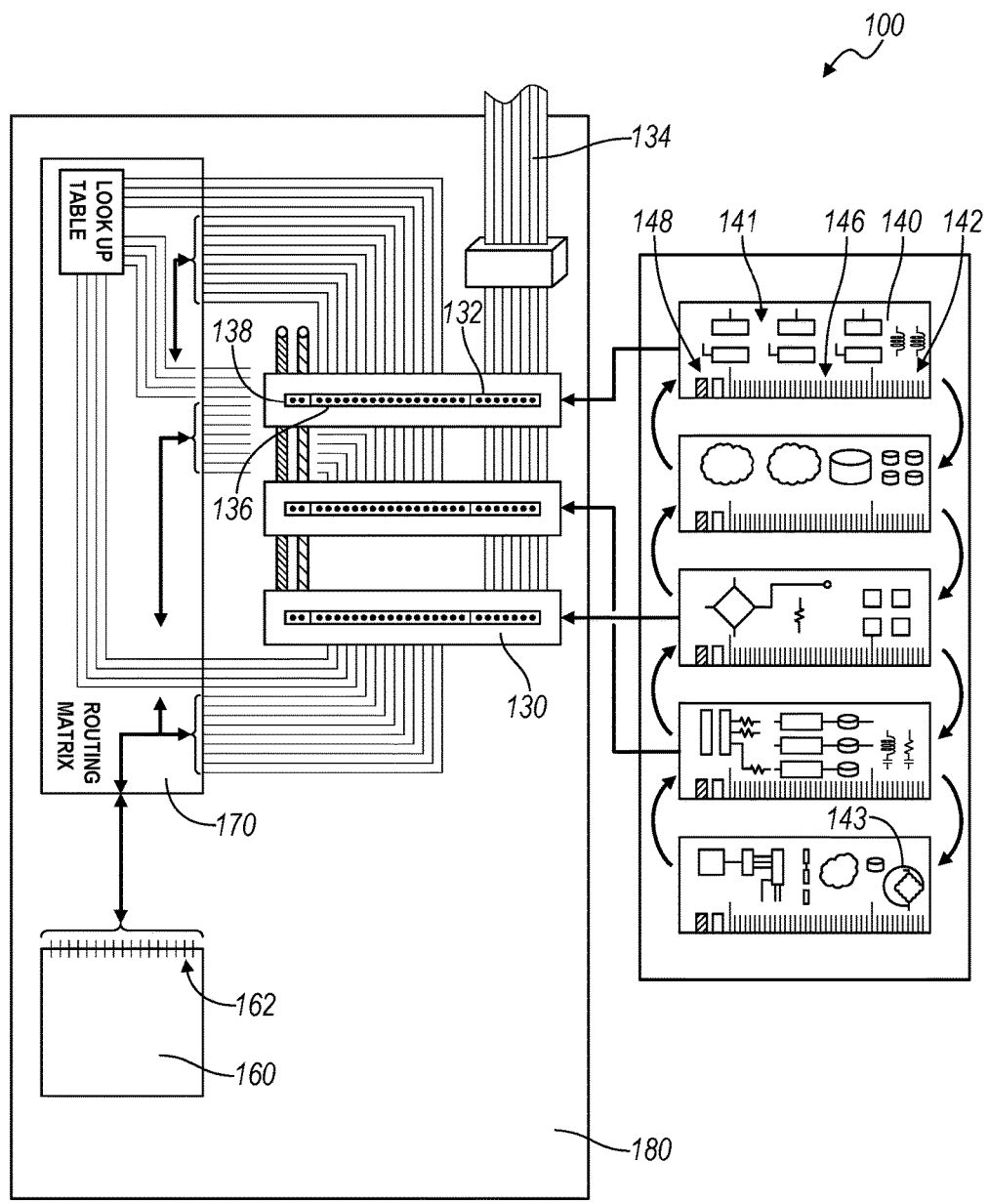
FIG. 3 is a schematic representation of one variation of the reconfigurable robotic system.

As shown in FIGS. 1, 2, and 3, a reconfigurable robotic system 100 includes: a base 110; an arm 120 extending from the base, including a set of articulable axes 122, and terminating in a head 124, the head 124 including a head interface board 126 defining a set of interface pins 128; a component interconnect 130 arranged within the base, including a set of interconnect pins 132 electrically coupled to the set of interface pins 128 via a set of hookup wires 134, and including a set of logic pins 136; a control card 140 configured to transiently engage the component interconnect 130 and including a set of interconnect pads 142 configured to contact the set of interconnect pins 132, a set of logic pads 146 configured to contact the set of logic pins 136, and a control circuit 141 interposed between the set of interconnect pads 142 and the set of logic pads 146, the control circuit 141 including a set of independently selectable function circuits 143 between each interconnect pad in a subset of the set of interconnect pads 142 and corresponding logic pads 146; an end effector 150 configured to transiently install on the head 124, including an end effector interface board 152 configured to electrically couple to the head interface board 126, and including an actuator and a sensor electrically coupled to the end effector 150 board; a processor 160 arranged within the base, including a set of I/O ports 162, configured to identify a type of the control card 140 and a type of the end effector 150, and configured to retrieve a logic configuration based on the type of the control card 140 and the type of the end effector 150; and a digital logic 170 arranged within the base, including a set of logic-side ports electrically coupled to the logic pins in the component interconnect 130, including a set of processor-side ports connected to the I/O ports 162 in the processor 160, and electrically coupling select logic-side ports in the set of logic-side ports to select processor-side ports in the set of processor-side ports based on the logic configuration received from the processor 160.

2. Applications

Figure 4:
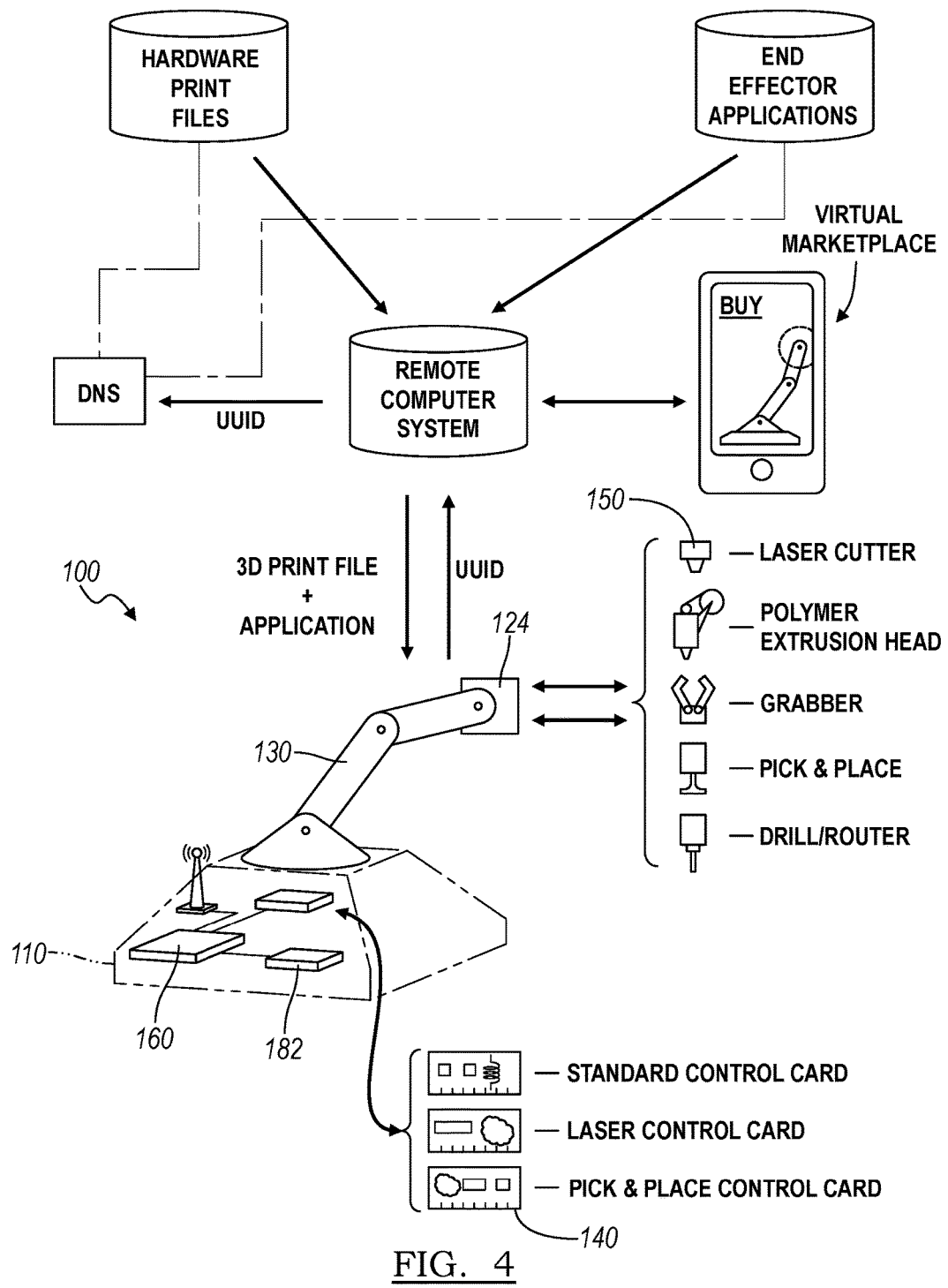
FIG. 4 is a flowchart representation of one variation of the reconfigurable robotic system.

Generally, the reconfigurable robotic system 100 ("the system 100") includes a base, an articulable arm, and control electronics that can receive and control a variety of different types of end effectors, such as any one of a gripper (or "grabber"), a 3D scanner, a polymer extruder (or "3D printing head"), a screw driver, a machine tool (e.g., lathe) interface, a laser cutter, a pick-and-place head, a router head, etc., as shown in FIG. 4. The system 100 can include a standard control card 140 that enables various end effector-specific combinations of power, sense, and control signals to be communicated between the processor 160 and various end effectors installed on the head 124. The system 100 can also include multiple component interconnects 130 configured to receive additional, alternate control cards 140 that enable the processor 160 to control additional functions or to control tailored functions, such as for custom end effectors or for end effectors requiring specialized or tailored signal processing circuits (or "higher-function end effectors"). Furthermore, by incorporating a set of component interconnects 130 in the base of the system 100 and receiving various combinations of control cards 140 in the base rather than incorporating end effector-specific control circuits 141 in each end effector, the system 100 can control various different end effectors through fewer (or only one) control card 140, reduce assembly complexity for each end effector, and reduce end effector mass. Hardware within the system 100 can therefore be relatively simple for a consumer to reconfigure, end effectors can remain relatively simple for the consumer to assemble from parts, and the processor 160 can actuate the arm at higher velocities and/or with improved positional control due to the lower mass of each end effector thus configured. Furthermore, because their physical design is decoupled from the size and layout of drive, sense, and control electronics necessary for the processor 160 to interface with an end effector, new end effectors may be more simple for a consumer to design and fabricate.

The system 100 can include a base that houses the processor 160, the digital logic, and the component interconnect 130($s$), and the base can support an arm including one or more articulable axes. For example; the arm can include: a first link coupled to the rotary table via a first joint capable of pivoting the first link 190° about a first horizontal axis relative to the rotary table; a second link coupled to the distal end of the first link via a second joint capable of pivoting the second link 160° about the first horizontal axis relative to the distal end of the first link; a head coupled to the distal end of the second link via a third joint capable of pivoting the head 124 380° about the first horizontal axis relative to the distal end of the second link; and a rotary connector arranged within the head 124 and capable of rotating 380° within the head 124 and about a second horizontal axis perpendicular to the first horizontal axis. In this example, the head interface board 126 can be integrated into the rotary connector, and the rotary connector can include a quick-disconnect junction such that an end effector can be installed and removed from the rotary connector and such that the end effector 150 interface board in an end effector mates with the head interface board 126 in the head 124 when the end effector 150 is installed on the rotary connector.

3. Marketplace

As shown in FIG. 4, the system 100 can interface with a virtual marketplace to supply hardware (e.g., end effector case print files), software (e.g., applications and logic configurations), and electronics (e.g., actuators and sensors) for additional end effectors to a customer (i.e., a "user"). For example, the system 100 and the virtual marketplace can cooperate to form a reconfigurable robotic platform through which a user may order hardware, software, and electronics for a new end effector, fabricate components for the new end effector locally, and access an interface through which to control the end effector 150 manually and/or to program the processor 160 to control the end effector 150.

3.1 Marketplace: Hardware

In one implementation, in a standard configuration, the system 100 is shipped to a user with a standard control card 140 and a polymer extrusion end effector. The user can then access the virtual marketplace, such as through a web browser, to order a second end effector. For example, the user can select a standard end effector from a list of end effectors available with print files for cases, applications, and sensor and actuator packages. Alternatively, the virtual marketplace can enable the user to drag and drop end effector functions (e.g., grip, print, cut, etc.), end effector capacity (e.g., laser power output, gripping force), end effector speed (e.g., maximum router speed), etc.; once the user submits these selections, the virtual marketplace (e.g., a remote computer system hosting or interfacing with the virtual marketplace) can generate a print file for a housing for a new end effector, an application for controlling the new end effector, and a bill of materials (BOM) for requisite actuators, sensors, fasteners, and other specialized hardware for the new end effector. With the polymer extrusion end effector installed on the head 124, the system 100 can then download and execute the print file to create the housing for the new end effector; the user can access the BOM for the new end effector and source these components manually, or the platform can ship all or select components in the BOM to the user; and the system 100 can download and install the application for the new end effector once the new end effector is assembled and installed on the head 124.

3.2 Marketplace: Software

Generally, the system 100 (e.g., the processor 160 can download—from a remote computer system, via the marketplace—an application specific to the end effector 150 installed on the head 124, as shown in FIG. 4. The system 100 can then execute the application to manipulate the arm and the end effector 150 while the end effector 150 remains installed on the head 124.

In one example, the marketplace includes a 3D printing application including: an interface for uploading and processing an .STL (stereolithography) file into a stepped print file; and a driver for manipulating axes in the arm and for controlling a polymer extrusion end effector installed on the head 124 according to the stepped print file. When paired with a polymer extrusion end effector, the system 100 can execute the 3D printing application to realize 3D printing functions to create new 3D objects from digital files.

In another example, the marketplace includes a grabber application including: an interface for switching between record and playback settings and for creating motion paths digitally; and a driver for recording manual manipulation of a grabber-type end effector installed on the head 124 and for actuating various axes of the arm and the end effector 150 to replay recorded manual motions or digitally-created motion paths. When paired with a grabber-type end effector, the system 100 can execute the grabber application to manipulate physical objects in real space.

In yet another example, the marketplace includes a laser-cutting application including: an interface for setting laser diode output parameters and for uploading and processing a 2D cut file; and a driver for manipulating axes in the arm and for controlling a laser diode in a laser-cutter end effector installed on the head 124 according to the 2D cut file. When paired with a laser-cutter end effector, the system 100 can execute the laser cutting application to realize laser-cutting functions to cut or etch physical materials.

3.3 Marketplace: Electronics

Generally, the system 100 incorporates signal processing, power driver, and other common circuits into one or more reconfigurable control cards 140 that can be transiently installed in the base. Because power transmission circuits and signal processing circuits are incorporated into control cards 140 in the base, various lower-function end effectors can include only actuators (e.g., motors, heaters) and sensors (e.g., thermocouples, optical encoders) to the exclusion of digital circuits, thereby eliminating a need for end effector-specific interface boards (e.g., PCBs) and circuit layouts for every lower-function end effector installed on the head 124. Rather, a set of sensors and actuators in a first end effector can be connected directly to a generic end effector interface board 152, such as by soldering leads from the sensors and actuators directly onto a standard solder pad array on the end effector 150 interface board; when the first end effector is installed on the head interface board 126, the generic end effector interface board 152 can mate with the head interface board 126 to communicate power, sense, and/or digital control signals between the base and the first end effector. The processor 160 and the digital logic 170 can cooperate to (re)configure control circuits 141 on control cards 140 installed in component interconnects 130 in the base in order to activate select power, sense, and/or control functions specifically for the combination of actuators and sensors in the first end effector. Later, a user can disassemble the first end effector, remove the sensors and actuators from the generic end effector interface board 152, 3D-print a new housing for a second end effector, solder another set of sensors and actuators to the same generic end effector interface board 152, assemble the second end effector, and install the second end effector on the head 124. The processor 160 and the digital logic 170 can again cooperate to reconfigure control circuits 141 on control cards 140 in the base in order to activate select power, sense, and/or digital control functions specifically for the combination of actuators and sensors in the second end effector.

However, the system 100 can also include component interconnects 130 that receive end effector-specific control cards 140 and/or function-specific control cards 140 to enable end effectors with extended functions (e.g., specialized function circuits 143, different voltage supplies, different clock speeds or sampling frequencies, etc.). Because extended-function circuits 143 can be incorporated into end effector-specific and function-specific control cards 140 rather than into each specific end effector, single specialized control cards 140 can be used across multiple end effectors requiring such specialized power, signal processing, and/or digital communications circuitry. In particular, a user can install various combinations of end effector-specific and/or function-specific control cards 140 (e.g., X-number of control cards 140) into a set of component interconnects 130 to enable extended functions across various types of end effectors (e.g., Y-number of end effector types, wherein Y is greater than X), as shown in FIG. 4.

Furthermore, by integrating function circuits 143 into removable control cards 140 rather than into end effectors, the size and geometry of an end effector can be agnostic to the function circuit 143 required to control the end effector 150. Similarly, because function circuits 143 are integrated into removable control cards 140 rather than into end effectors, the total mass of an end effector can be kept to a minimum, thereby enabling greater maximum travel speeds of the arm when the end effector 150 is installed on head.

However, the system 100 can also support high-level (e.g., specialized) end effectors requiring extended power and/or communications functions. For example, if the head interface board 126 includes 24 pins that cover all power, sense (i.e., input), and digital control (i.e., logic-level output) communications between the processor 160 and the head interface board 126 (via the digital logic 170, the component interconnects 130, one or more control cards 140, etc.) but an end effector for a particular function requires more than 24 power, sense, and/or digital control lines, a second end effector board with a serial communications bus can be installed into the end effector 150 and connected to two pins on the head interface board 126 coupled to a first subset of two channels on a standard control card 140 set to digital I/O. In this example, a second subset of eleven channels on the standard control card 140 can be set to a voltage supply state, and a third subset of the remaining eleven channels on the control card 140 can be set to a ground state. In this example, the processor 160 can thus communicate with the high-level end effector over digital communication protocol (e.g., I2C, USB) via the first subset of channels, and power and ground can be provided to the end effector 150 via the second and third subsets of channels, respectively. The second end effector board can also include function circuits 143 necessary to power, control, and read various actuators and/or sensors within the end effector 150.

Therefore, when a user selects a new low-function end effector on the virtual marketplace, the platform can ship the user a fresh standard end effector interface board 152 or prompt the user to reuse an old standard end effector interface board 152 when assembling the low-function end effector. Furthermore, when the user selects an extended-function end effector on the virtual marketplace, the platform can ship the user an end effector-specific or function-specific control card 140 to enable functions required by the extended-function end effector. Finally, when the user selects a high-function end effector on the virtual marketplace, the platform can ship a second end effector board to the user, and the user can connect and install the second end effector board in the high-function end effector. Alternatively, the user can design, fabricate, and install components on a custom PCB to create a second end effector board for a high-function end effector; the user can also write and load a custom routing matrix and lookup table onto the digital logic 170 to (re)configure control cards 140 installed in the component interconnects 130 to interface with the new high-function end effector.

Yet alternatively, when the user selects a new end effector on the virtual marketplace, the platform can serve a Gerber file for a standard end effector interface board 152, for an end effector-specific or function-specific control card 140, and/or for a second end effector board for a high-function end effector to the user's system. The user can then install a PCB-router end effector on the head 124, locate PCB stock adjacent the system 100, and zero the PCB-router end effector on the PCB stock; the processor 160 can then manipulate the arm and the end effector 150 according to the Gerber file in order to fabricate a new PCB for a new end effector. If the standard end effector interface board 152, control card 140, or second end effector board requires installation of additional components, the platform can also ship these component to the user, and the user can manually solder these components onto the PCB. Alternatively, the platform can ship to the user a strip of component tape containing all necessary components for the standard end effector interface board 152, control card 140, or second end effector board and serve a pick-and-place file to the system 100; the user can install a pick-and-place end effector on the head 124 and then zero the pick-and-place end effector on the PCB and the component tape; the processor 160 can then manipulate the arm and the end effector 150 according to the pick-and-place file in order to select components from the component tape and to then install these components on the new PCB. In this example, the pick-and-place end effector can also include a solder paste dispenser and a reflow heating element or reflow laser, and the processor 160 can selectively trigger the solder paste dispenser to dispense solder paste onto select areas of the PCB before placing components, and the processor 160 can selectively trigger the reflow heating element or the reflow laser to reflow dispensed solder paste to complete the PCB.

The platform can therefore enable a user to buy new end effectors without buying a complete hardware system by leveraging a polymer extrusion end effector to create physical components for new end effectors (i.e., hardware), by leveraging an application database accessible by the process to recognize the system 100 (i.e., software), and by leveraging one or more control cards 140 that support multiple functions that can be selectively activated and deactivated per channel.

4. End Effector and Head

As shown in FIG. 3, the head 124 includes a quick disconnect that transiently receives and releases an end effector. The head 124 includes a head interface board 126 defining a set of interface pins 128 through which the processor 160 sends and receives analog and/or digital power, control, and sense signals to an installed end effector.

In one example implementation, the head interface board 126 includes a PCB with 24 spring-loaded pins arranged in a linear, radial, or other geometric array on a first side of the PCB, wherein the first side of the PCB faces outwardly from the head 124 to mate with pin pads on an adjacent end effector interface board 152, as described below and shown in FIG. 2. In this example implementation, each interface pin is connected to one interconnect pin in the component interconnect 130 (or to one interconnect pin in each of a set of component interconnects 130) via a hookup wire 134, such as a coated solid-core or braided wire extending from the interface at the head 124 to the base. The hookup wires 134 can be bundled into a ribbon cable, as shown in FIG. 3, and all wires in the ribbon cable can be substantially identical in length, size, and type. For example, each hookup wire 134 can include a 24-gage, 8-core braided, insulated copper wire. Alternatively, the system 100 can include: a first subset of hookup wires 134 sized for relatively high current load (i.e., power lines sufficient to communicate up to 2.5 A of current at 5V between the component interconnect 130 and the head 124); and a second subset of wires sized for low-current loads (i.e., logic-level sense and control lines sufficient to communicate up to 20 mA of current at 5V between the component interconnect 130 and the head 124). In this example, the first subset of hookup wires 134 can include ten wires, each 24-gage, 8-core braided, insulated copper wire that can be reconfigured as voltage supply, ground, or digital I/O lines and that can supply up to 2.5 A continuous DC current at 5V to an installed end effector. Furthermore, in this example, the second subset of hookup wires 134 can include fourteen wires, each 30-gauge solid-core insulated copper wire that can be configured as digital I/O lines.

In the foregoing example implementation in which the head interface board includes 24 interface pins, the end effector 150 can include an end effector interface board 152 that includes a PCB with 24 pin pads on a first side and was to 24 solder pads on a second side opposite the first side. When the end effector 150 is installed on the head 124, the pin pads on the end effector 150 interface board can thus mate with (i.e., electrically couple to) corresponding interface pins on the head interface board 126. In this example implementation, a user can manually solder wires from one or more actuators (e.g., motors, heaters) and sensors, etc. onto select solder pads on the end effector 150 interface board in order to complete electronic assembly of an end effector. After further assembling a (3D-printed) housing around the actuator, sensors, and end effector interface board 152, the user can install the (new) end effector on the head 124 via a quick-release of other suitable type of mechanical connector.

The system is described as having pins in the head interface board 126 and pin pads on the end effector 150 interface board. However, the head interface board 126 and the end effector 150 interface board can include any other connectors that interface in any other way to communicate power, sense, and/or control signals between the head 124 and the end effector 150.

5. End Effector Identification

In one variation, the end effector 150 includes an identification package that communicates an identifier for the end effector 150 (e.g., an end effector type code, a UUID) to the processor 160 on system startup or when the end effector 150 is installed on the head 124. In this variation, the processor 160 can read the identifier from the identification package and can automatically reconfigure the system 100 specifically for the end effector 150 before supplying power to the end effector 150.

In one example, an integrated identification chip pre-loaded with a UUID (8-bit UUID) is installed on the end effector 150 interface board and connected to an ID power pad, an ID ground pad, and an ID read pad—distinct from the interface pads—on the end effector 150 interface board via a set of traces. For example, the end effector 150 interface board can be supplied to the user with the identification chip installed. The ID power, ground, and read pads can connect to a set of ID power, ground, and read pins—distinct from the interface pins—on the head interface board 126 when the end effector 150 is installed on the head 124, and the ID power, ground, and read pins can be connected directly to the CPU or connected to the CPU via a control card 140 or via the digital logic 170. Thus, when the end effector 150 is installed on the head 124, the processor 160 can read the UUID from the identification chip via the ID power, ground, and read pads on the end effector 150 interface board. The processor 160 can then access a local or remote DNS and pass the UUID into the DNS to retrieve a type, a serial number, a pointer to a corresponding application, and/or a pointer to a logic configuration, etc. for the end effector 150.

The system 100 can also enable the user to assign a type, application, and/or logic configuration, etc. of an end effector to the UUID written to the end effector 150. For example, when the end effector 150 is first assembled and installed on the head 124, the processor 160 can read the UUID from the identification chip on the end effector 150 interface card, as described above, pass the UUID to the remote DNS to identify the end effector 150, and then retrieve an application specific to the end effector 150 from an applications database based on the UUID, as shown in FIG. 4. If a type, application, and/or logic configuration has not yet been assigned to this UUID, the processor 160 can prompt the user to pair the UUID with an end effector type, end effector name, application, and/or logic configuration etc. In this example, when the end effector 150 is first connected to the head 124, the processor 160 can automatically direct the user to an end effector menu, such as at an onboard digital display (e.g., a digital display connected to the base) or within a native robotic control application executing on a local mobile computing device (e.g., smartphone, tablet) paired to the system 100. The user can then select or enter any of the foregoing data through the menu, and the processor 160 can store addresses or pointers for these data with the UUID in the local or remote DNS.

Alternatively, in the foregoing implementation, the identification chip can be loaded with pointers (e.g., URLs) to application and logic configuration content, a callout for end effector type, a serial number of the end effector 150 or end effector interface board 152, and/or any other relevant data; and the processor 160 can retrieve these data from the identification chip when the end effector 150 is installed on the head 124 in order to configure the system 100 specifically for the end effector 150.

In another implementation, a switch bank (e.g., an 8-bit switch bank) and a multiplexer connected to the switch bank are factory-installed or user-installed on the end effector 150 interface board. When assembling the end effector 150 interface board in an end effector, the user can manually set or clear each bit on the switch bank in order according to a callout specified for the type of the end effector 150, such as "0000001" for a polymer extrusion-type end effector, "00000010" for a grabber-type end effector, and "00000011" for a laser cutter-type end effector, etc. The multiplexer can communicate parallel bits in switch serially to the processor 160 via a single logic level channel, such as through one read pad on the end effector 150 interface board and one read pin on the head interface board 126. On startup or when an end effector is installed on the head 124, the processor 160 can thus read the state of each bit in the switch bank by polling the multiplexer and then implement the methods and techniques described above to select an application and/or logic configuration for the end effector 150. However, the processor 160 can identify an installed end effector in any other way based on data received from the end effector 150 in any other suitable format.

6. Component Interconnect 120

As shown in FIG. 4, the system 100 includes a component interconnect arranged within the base, including a set of interconnect pins 132 electrically coupled to the set of interface pins 128 via a set of hookup wires 134, and including a set of logic pins 136. Generally, the component interconnect 130 defines a card receptacle configured to transiently receive a control card 140. In particular, the card receptacle can receive a first control card 140 to enable a first set of functions at an end effector installed on the head 124, and the first control card 140 can later be replaced by a second control card 140 in the card receptacle to enable a second set of functions at the same or other end effector installed on the head 124.

The card receptacle in the component interconnect 130 is configured to receive a control card 140 and defines multiple pins that engage pads on a control card 140, as described below. In one implementation, the component interconnect 130 includes an interconnect pin set electrically connected to the head interface board 126, such as via a ribbon cable or group of hookup wires 134. For example, for the head interface board 126 that includes 24 interface pins, the first interconnect pin set can include 24 interconnect pins, each interconnect pin connected to one interface pin on the head interface board 126 via one hookup wire 134.

In this implementation, the component interconnect 130 also includes a logic pin set including pins connected to ports on the digital logic 170 (which is connected to the processor 160) or directly to ports on the processor 160. In this implementation, the number of logic pins can exceed the number of interconnect pins. The component interconnect 130 can also include a power pin 138 set, such as including a single large ground pin and a single large voltage supply pin that provide a regulated 5V DC voltage to an end effector installed on the head 124 via a control card 140 installed in the component interconnect 130. Alternatively, the power pin 138 set can include multiple voltage supply pins, such as a first voltage supply pin connected to a regulated 3.3V DC voltage source in the base supplying up to 500 mA, a second voltage supply pin connected to a regulated 5V DC voltage source in the base supplying up to 1 A, a third voltage supply pin connected to a regulated 12V DC voltage source in the base supplying up to 2.5 A, and a fourth voltage supply pin connected to a regulated 24V DC voltage source in the base supplying up to 5 A.

However, the component interconnect 130 can include any other number or configuration of pins within a card receptacle or receiver of any other geometry configured to transiently receive a control card 140.

In one implementation, the system 100 includes a motherboard 180 arranged in the base, and the processor 160, digital logic 170, and component interconnect 130(s) can be installed in the base, as shown in FIGS. 1 and 3. Alternatively, the system 100 can include a sister board connected to the motherboard 180, such as by a ribbon cable, and the component interconnect 130(s) can be installed on the sister board. The base can include a window or door through which a user can access a component interconnect 130 to install or remove a control card 140 from the component interconnect 130. However, the component interconnect 130 can be arranged within the system 100 in any other suitable way.

7. Control Card 140: Standard Channel Configurations

The system 100 includes a control card 140 configured to transiently engage the component interconnect 130. The control card 140 also includes a set of interconnect pads 142 configured to contact the set of interconnect pins 132, a set of logic pads 146 configured to contact the set of logic pins 136, and a control circuit 141 interposed between the set of interconnect pads 142 and the set of logic pads 146, wherein the control circuit 141 includes a set of independently selectable function circuits 143 between each interconnect pad in a subset of the set of interconnect pads 142 and corresponding logic pads 146. Generally, the control card 140 can be installed in the component interconnect 130 to enable various power, sense, and control functions between an installed end effector and the processor 160. In particular, the control card 140 can define a shield between the processor 160 (via the digital logic 170) and the end effector 150 and can include multiple function circuits 143 (e.g., a ground function, a power supply function, and a digital I/O function) for each of multiple channels (i.e., interconnect pads 142) on the card, and the processor 160 can selectively activate and deactivate various function circuits 143 to match power, sense, and control needs at the installed end effector.

In one implementation, the control card 140 includes: a tongue configured to seat in a card receptacle of a component interconnect 130; a set of interconnect pads 142 arranged across a first section of the tongue and configured to mate with corresponding pins in the interconnect pin set; a set of logic pads 146 arranged across a second section of the tongue and configured to mate with corresponding pins in the logic pin set; and a set of power pads 148 arranged across a third section of the tongue and configured to mate with corresponding pins in the power pin 138 set when the control card 140 is installed in the component interconnect 130. For example, the control card 140 can include one pad per pin in a standard component interconnect 130.

As shown in FIG. 3, the control card 140 also includes a control circuit 141 between the sets of interconnect, logic, and power pads 148, and the control circuit 141 can include multiple function circuits 143 between an interconnect pad and one or more logic pads 146. Generally, each interconnect pad on the control card 140 can define a channel that can be set in one of multiple states, as described below. When the control card 140 is installed in the component interconnect 130, interconnect pads 142 on the control card 140 engage corresponding interconnect pins in the component interconnect 130 and are thus electrically connected to a corresponding pin in the head interface board 126 via a hookup wire 134, cable, or other conductive connector. Similarly, when the control card 140 is installed in the component interconnect 130, logic pads 146 on the control card 140 engage corresponding logic pins in the component interconnect 130; logic pins in the component interconnect 130 can be connected to ports on the processor 160 directly or through the digital logic 170. The control circuit 141 on the control card 140 can thus receive digital logic 170 level signals from the processor 160 via the digital logic 170, the logic pins, and/or the logic pads 146 to set the state of each channel (i.e., each interconnect pad) on the control card 140. Once each channel state is thus set, the control card 140 can: receive digital logic 170 level control signals from the processor 160 to control high(er)-current outputs from select channels; pass digital logic 170 level control signals received from the processor 160 through other select channel to the head interface board 126; and pass original or processed sensor signals received from head interface board 126 to select logic pins and on to the processor 160.

Therefore, the interconnect pads 142 can define a set of reconfigurable I/O channels, and the control circuit 141 can support various I/O states for each interconnect pad. For example, each interconnect pad on a control card 140 can be set in one of: a ground state in which the interconnect pad is tied to ground; a power supply state in which the interconnect pad is (intermittently or constantly) tied to the voltage supply pad; or a general-purpose I/O state in which the interconnect pad is connected directly to a corresponding logic pad on the control card 140. In this implementation, for each interconnect pad, the control circuit 141 can include: one NPN transistor in a "ground function circuit 143" configured to electrically couple the interconnect pad to the ground pad; one PNP transistor in a power function circuit 143 configured to electrically couple the interconnect pad to the voltage supply pad; and one bypass circuit that directly connects the interconnect pad to a corresponding logic pad. Thus, in this implementation, each interconnect pad—and therefore each pad in the head interface board 126—can be reconfigured as any one of constant ground, a voltage supply, or a digital I/O channel.

The control circuit 141 can also support various other channel states at all or a subset of the interconnect pins. Generally, the control circuit 141 can include additional function circuits 143 that enable additional I/O functions at select interconnect pads 142 on the control card 140.

In one implementation, the control circuit 141 includes a motor driver (e.g., a dual H-bridge) per each interconnect pad in a first subset of interconnect pads 142, such as for four of 24 interconnect pads 142. In this implementation, an interconnect pad connected to a motor driver can thus selectively source power into a corresponding pin at the head interface board 126, such as to power a motor, a heater, or other actuator within an end effector installed on the head 124. For an interconnect pad in this first subset of interconnect pads 142, the control circuit 141 can also include a boost circuit configured to boost a supply voltage for the interconnect pad, such as from a standard 5V supply to 12V. Each motor driver (or each H-bridge within a motor driver) in the control circuit 141 can be coupled to a digital activate line via a first logic pad and can be activated and deactivated based on a digital signal received at the first logic pin. Each motor driver can also be connected to a control line via a second logic pin, and the processor 160 can communicate a pulse-width-modulated signal into the motor driver via the control line and the second logic pad to set the effective output voltage of the motor driver. The circuit can also include a switch or relay between each boost circuit and the voltage supply pad to selectively activate the boost circuit and to select a supply voltage into the corresponding motor driver. Alternatively, in the implementation described above in which the component interconnect 130 includes multiple power supply pins connected to power supplies arranged in the base (e.g., on the motherboard 180 or on a separate isolated board), the control circuit 141 can include a set of power switches or relays that selectively couple a motor driver to one power supply in the set of power supplies based on a voltage specification and current demand at a corresponding actuator in an end effector installed on the head 124.

In a similar implementation, the control circuit 141 can include a stepper motor driver per each interconnect pad in a second subset of interconnect pads 142, such as for two of 24 interconnect pads 142 on the control card 140. The control card 140 can additionally or alternatively include a servo controller per each interconnect pad in the second subset of interconnect pads 142.

In this implementation, the control circuit 141 can additionally or alternatively include one analog-to-digital (A/D) converter per each of a third subset of interconnect pads 142, such as for two of the 24 interconnect pads 142. For an interconnect pad connected to an A/D converter and set in an analog-in state, the interconnect pad can receive analog signals from a corresponding pin in the head interface board 126, such as from a temperature sensor or light level sensor in an end effector installed on the head 124, and the interconnect pad can pass this analog signal into the A/D converter; the A/D converter can then convert the analog signal into a digital signal and communicate this converted digital signal into the digital logic 170 via a logic pad paired with the interconnect pad. Each A/D converter in the control circuit 141 can be coupled to a digital activate line via a first logic pad and can be activated and deactivated based on a digital signal received at the first logic pin. The A/D converter can include a multiplexer connected to a second logic pin, the A/D converter can write digital bits to the multiplexer based on a voltage of an input signal received at the corresponding interconnect pad, and the processor 160 can read the multiplexer via the second logic pad.

The control circuit 141 can also include one or more signal conditioning circuits per each of a fourth subset of interconnect pads 142, such as for eight of the 24 interconnect pads 142. For example, for one interconnect pad in the fourth subset of interconnect pads 142, the control circuit 141 can include: an Op-amp; a set of digital potentiometers connected in parallel in series across the power inputs, the signal inputs, and the signal output of the Op-amp; a set of high-current bypass switches in parallel with each digital potentiometer; and a shift register that sets the resistance value of each digital potentiometer and that activates and deactivates the bypass switches based on a serial input from one logic pad. In this example, the set of digital potentiometers and bypass switches can be arranged within the signal conditioning circuit to achieve inverting amplifier, non-inverting amplifier, voltage follower, integrator, differentiator, differential amplifier, comparator, and/or other Op-amp functions based on digital potentiometer and bypass switch configurations, as specified by the processor 160 and set by the shift register. Alternatively, in another example, the control circuit 141 can include: an inverting amplifier circuit between a first logic pad and a first corresponding interconnect pad; a non-inverting amplifier circuit between a second logic pad and a second corresponding interconnect pad; a voltage follower circuit between a third logic pad and a third corresponding interconnect pad; an integrator circuit between a fourth logic pad and a fourth corresponding interconnect pad; a differentiator circuit between a fifth logic pad and a fifth corresponding interconnect pad; and a comparator circuit between a sixth logic pad and a sixth corresponding interconnect pad in the third set of interconnect pads 142. In this example, each Op-amp circuit can be activated and deactivated by the processor 160 via another dedicated logic pad.

Similarly, the control circuit 141 can include a set of signal filters per each of a fifth subset of interconnect pads 142. For example, the control circuit 141 can include: one high-pass filter between a first interconnect pad—in the fourth set of interconnect pads 142—and a corresponding logic pad; one low-pass filter between a second interconnect pad—in the fourth set of interconnect pads 142—and a corresponding logic pad; and one band-pass filter between a third interconnect pad—in the fourth set of interconnect pads 142—and a corresponding logic pad.

The control circuit 141 can also include a communication bus chip that merges multiple interconnect pads 142 and logic pads 146 into a single two-way communication bus. For example, the control circuit 141 can include a dedicated local communications circuit connected to four interconnect pads 142 and supporting Universal Serial Bus ("USB") communications with an end effector installed on the head 124. In this example, when active, the dedicated local communications circuit can couple a first interconnect pad to the voltage supply pad, can set a second interconnect pad in a "Data−" state, can set a third interconnect pad in a "Data+" state, and can couple a fourth interconnect pad to the ground pad. The dedicated local communications circuit can then handle handshake packets received from a USB-enabled end effector—installed on the head 124 and electrically connected to the four corresponding pins on the head interface board 126. The dedicated local communications circuit can thus support a communication standard and can interface with connected end effectors supporting the same communication standard. In this example, the dedicated local communications circuit can also set power supply limits to the first interconnect pad—connected to the power supply—based on communications received from an end effector installed on the head 124, such as by switching power supply limits from 150 mA to 500 mA based requests for higher current supply from the connected end effector. The dedicated local communications circuit can also selectively connect additional interconnect pads 142 to the power supply to supply additional current to the head interface board 126 to provide additional power to the connected indicator based on power requests received therefrom and handled by the dedicated local communications circuit. Furthermore, when active, the dedicated local communications circuit can also pass token packets and data packets received through the second ("Data−") and the third ("Data+") interconnect pads 142 to two corresponding logic pads 146. The control circuit 141 can additionally or alternatively include dedicated local communications circuits supporting FireWire, Ethernet, MIDI, Thunderbolt, RS232, and/or other communication standards for interfacing with connected end effectors through a set of interconnect pads 142.

Therefore, the control card 140 can include a set of interconnect pads 142 and a control circuit 141 that supports various combinations of analog and/or digital I/O functions for each channel (i.e., at each interconnect pad) on the control circuit 141 based on logic level signals received at select logic pads 146 on the control card 140.

In one implementation, each interconnect pad is connected in parallel to a set of function circuits 143, such as to a combination of power transistors, to a power driver, to an Op-amp circuit, to a signal conditioning circuit, to a communications circuit, and/or other functional circuits. In this implementation, a particular function circuit 143 connected to an interconnect pad can be activated and all other function circuits 143 connected to the interconnect pad can be deactivated in order to set a particular state of the interconnect pad. Each function circuit 143 can include a switch connected to a logic pad, wherein the switch activates and deactivates the function circuit 143 based on a digital signal received—from the processor 160 via the digital logic 170—at the corresponding logic pad, such as a logical low (binary 0, less than 2.5V) to deactivate the function circuit 143 and a logical high (binary 1, greater than 3V) to activate the function circuit 143. In this implementation, the system 100 can leverage shift registers or multiplexers integrated into the digital logic 170 to set and lock the state of each function circuit 143 in each channel on the control card 140.

Alternatively, the control circuit 141 can include one shift register per interconnect pad (or subset of interconnect pads 142), wherein each function circuit 143 dedicated to a particular interconnect pad is connected to one output pin of the shift register assigned to the particular interconnect pad. The shift register can include a data-in pin connected to one logic pad of the control card 140, and the processor 160 can write a serial bit array to the shift register to activate and deactivate select function circuits 143 for the particular interconnect pad. For example, each function circuit 143 can be deactivated by setting a corresponding bit in the shift register to 0 and can be activated by setting the corresponding bit in the shift register to 1. In this example, if the control circuit 141 supports eight distinct states for an interconnect pad—that is, includes eight function circuits 143 connected to the interconnect pad—the control circuit 141 can include an 8-bit shift register, including one output pin connected to a switch in a function circuit 143 for each of the eight function circuits 143; the processor 160 can thus write an 8-bit logic array including no more than one 0 (i.e., no more than one logical high) to the data-in pin of the shift register—via the connected logic pad—in order to activate a single function circuit 143 for the interconnect pad.

Therefore, the control circuit 141 can include input-type function circuits 143 that receive analog or digital signals from a connected end effector via a corresponding interconnect pad. The control circuit 141 can include a discrete trace that connects one output of an input-type function circuit 143 to one logic pad on the control card 140 for each input-type function circuit 143 in the control circuit 141. For example, the control circuit 141 can connect the input of a bypass circuit to an interconnect pad and can connect the output of the bypass circuit directly to a corresponding logic pad. In another example, the control circuit 141 can connect an interconnect pad to the input of an A/D converter and can connect a multiplexed output of the A/D converter to a corresponding logic pad.

Similarly, the control circuit 141 can include output-type function circuits 143 that transmit analog or digital signals to a connected end effector via a corresponding interconnect pad. The control circuit 141 can include a discrete trace that connects one input of an output-type function circuit 143 to one logic pad on the control card 140 for each output-type function circuit 143 in the control circuit 141. For example, the control circuit 141 can connect a digital control input of an H-bridge motor driver to a logic pad and can connect a high-power output of the H-bridge motor driver to one (or to multiple) interconnect pads 142 on the control card 140, as described above.

The control card 140 can also include its own dedicated clock circuit and can communicate a clock signal output from the clock circuit to select integrated circuits within the control circuit 141, such as to each shift register, multiplexer, and communication bus chip on the control card 140. Alternatively, the control card 140 can include a clock pad that engages a clock pin in the component interconnect 130 to receive a clock signal from the processor 160 or from a standalone clock circuit within the base, and the control circuit 141 can distribute this clock signal to select integrated circuits on the control card 140.

8. Control Card 140 Expansion

In one variation, the system 100 includes multiple component interconnects, wherein each component interconnect 130 includes an interconnect pin set, a logic pin set, a power pin 138 set, and/or a clock pin. Additional control cards 140 supporting alternate functions can thus be installed in select component interconnects 130 to enable additional, more specialized, and/or customized I/O functions for a connected end effector.

In this variation, interconnect pin sets across the multiple component interconnects can be electrically connected in parallel, as shown in FIG. 3. For example, the first interconnect pin of the first component interconnect 130, a first interconnect pin of a second component interconnect 130, a first interconnect pin of a third component interconnect 130 are electrically connected in parallel to a first hookup wire 134 extending from a first interface pin of the head interface board 126 into the base. In this example, a second interconnect pin of the first component interconnect 130, a second interconnect pin of the second component interconnect 130, and a second interconnect pin of the third component interconnect 130, etc. are electrically connected in parallel to a second hookup wire 134 extending from a second interface pin of the head interface board 126 into the base; etc. The power pin 138 sets of the multiple component interconnects 130 can be similarly electrically connected in parallel. Furthermore, in this example, each logic pin across the multiple component interconnects 130 can be independently electrically coupled to one pin of the digital logic 170 or directly to one port of the processor 160.

In one example, the system 100 includes a standard control card 140 configured for insertion into a first component interconnect 130 and supporting a standard set of interconnect pad states—and therefore a standard set of functions for a connected end effector installed on the head 124. In this example, the standard control card 140 can include a control circuit 141 including various discrete function circuits 143 connected between select logic pads 146 and 24 interconnect pads 142 to enable: a ground state, a power supply state, and a general-purpose I/O state for each of the 24 interconnect pads 142; a motor drive state for each interconnect pad in a first subset of four interconnect pads 142; an analog input to digital output state for each interconnect pad in a second subset of four interconnect pads 142; and a input-signal conditioning state for each interconnect pad in a third subset of six interconnect pads 142; such as described above. In this example, a second control card 140 can be installed in a second component interconnect 130, and the second control card 140 can include a communication bus chip connected to four interconnect pads 142 on the second control card 140—which are connected in parallel to a fourth subset of four interconnect pads 142 on the standard control card 140 and therefore to corresponding pins in the head interface board 126—in order to support USB communications with a USB-enabled end effector. The system 100 can also include a third control card 140 that can be installed in the second component interconnect 130—in replacement of the second control card 140—and can include a set of stepper motor driver circuits, each connected to a set of interconnect pads 142 on the third control card 140, which are connected in parallel to a corresponding set of interconnect pads 142 on the standard control card 140 and therefore to corresponding pins in the head interface board 126.

In the foregoing example, a user can configure the system 100 with the standard control card 140 alone when a standard end effector is installed on the head 124, such as a two jaw gripper actuated by a single DC motor and include an optical encoder connected to each jaw, or such as a single-stage additive polymer printing head with a single heater, primary and backup thermistors, and single DC extruder actuator. In this configuration, DC motor drivers and digital pass-throughs on the standard control card 140 can support power and data communications with such a standard end effector. The user can then install the second control card 140 in the second component interconnect 130 when a second end effector—configured to support and manipulate a DSLR camera controlled via USB—is on the head 124. In this configuration: the second end effector can include a first DC motor connected to and configured to rotate a zoom ring on a lens installed on the DSLR camera and a second DC motor connected to and configured to rotate a focus ring on the lens; the first and second motors can be connected to a first DC motor driver and to a second DC motor driver, respectively, on the standard control card 140 via corresponding pins in the head interface board 126, pins in the first component interconnect 130, and interconnect pads 142 on the standard control board; and the second control board can support serial communications between the processor 160 and the DSLR camera. In this configuration, if the second end effector includes stepper motors configured to manipulate the zoom ring and the focus ring on the lens, the user can install the third control card 140 in a third component interconnect 130, and the processor 160 can control the position of each stepper motor via stepper motor drivers integrated into the third control card 140 in addition to controlling the camera via the communication bus chip integrated into the second control card 140 and to track positions of the zoom and focus rings via digital pass-throughs or low-pass filters in the standard control card 140. Furthermore, the user can later replace the second control card 140 with the third control card 140 when a third end effector—including a screw drive head configured to select and install small (e.g., #2 and smaller) threaded fasteners and powered by a multiple stepper motors for fine radial, lateral, and longitudinal control—is installed on the head 124. In this configuration, the processor 160 can control the position of each stepper motor via stepper motor drivers integrated into the third control card 140, and the processor 160 can read position change outputs by optical encoders installed on each stepper motor via low-pass filters integrated into the standard control card 140.

The system 100 can therefore include multiple component interconnects 130 configured to receive a standard control card 140 and/or other control cards 140 enabling additional, more specialized, and/or customized I/O functions for a connected end effector, as shown in FIG. 3. In this implementation, an end effector-specific control card 140 can be designed and fabricated for a specific end effector to enable a combination of input and/or output functions supported by sensors and actuators, respectively, integrated into the specific end effector. For example, a screw-drive-specific control card 140 can be designed and fabricated to support all input and output requirements for an end effector configured to select and install loose threaded fasteners in threaded bores.

Alternatively, a function-specific control card 140 can be designed and fabricated to enable a particular input function or output function at any end effector including a corresponding sensor(s) or including a corresponding actuator(s). For example, a laser-drive control card 140 including laser diode driver circuitry that outputs a laser drive signal at a regulated power and regulated frequency can be designed and fabricated for the system 100 and can later be installed in a component interconnect 130 to enable fine, remote control of a laser diode arranged in an end effector installed on the head 124. Therefore, multiple function-specific control cards 140 can be installed in various component interconnects 130 within the system 100 to achieve support for a combination of related functions at various end effectors installed on the head 124.

The control circuit 141 on the standard control card 140 described above can alternatively be integrated into the motherboard 180 (or into a sister board) intransiently installed in the base, as described above, and the system 100 can include a set of component interconnects 130 that transiently receive control cards 140 to support additional functions.

9. Digital Logic 170

As shown in FIG. 3, the system 100 includes a digital logic 170 electrically interposed between the processor 160 and the component interconnect 130(s). The digital logic 170 can include a complex programmable logic device (CPLD), a field-programmable gate array (FPGA), or any other suitable type of glue logic containing one or more reconfigurable I/O blocks. Generally, the digital logic 170 can dynamically reconfigure connections between I/O ports 162 on the processor 160 and each channel across a set of installed control cards 140 to dynamically set states of function circuits 143 on this set of installed control cards 140.

The digital logic 170 can include a set (e.g., hundreds) of processor-side ports connected (e.g., hardwired) to logic pins in the component interconnects 130 and a set (e.g., dozens) of processor-side ports connected to I/O ports 162 on the processor 160, as shown in FIG. 3. In the implementation described above in which each function circuit 143 on a control card 140 is activated and deactivated via a logic pin, the processor 160 can load a lookup table onto the digital logic 170, and the digital logic 170 can implement the lookup table to selectively set the state of—that is, to selectively activate or deactivate—each function circuit 143 on each control card 140 installed in the system 100. The processor 160 can also write a routing matrix to the digital logic 170, and the digital logic 170 can implement the routing matrix to couple select channels across the installed control cards 140 to I/O ports 162 on the processor 160.

The digital logic 170 can therefore be reconfigured over time based on logic configuration data received from the processor 160 in order to activate and deactivate select function circuits 143 on one or more control cards 140 installed in the component interconnects 130 and in order to selectively couple and decouple digital output and digital input channels on the control cards 140 to select I/O ports 162 on the processor 160.

10. Processor

The processor 160 controls actuators within the arm, at the head 124, and at an installed end effector based on a selected program, based on manual inputs provided by a user or remote controller, and/or based on outputs of various sensors arranged in the base, the arm, the head 124, and/or the installed end effector. Generally, the processor 160 functions to access an application for a type of end effector installed on the head 124, to write a logic configuration to the digital logic 170 based on the type of end effector and one or more control cards 140 installed in one or more component interconnects 130, and to communicate with actuator drivers in the base and on the installed control card 140(s) to actuate various actuators within the arm and within the end effector 150 based on an executed program and signals received from various sensors within the arm and within the end effector 150.

When a new end effector is installed on the head 124, the processor 160 retrieves an application specific to the end effector 150, such as by calling the application from local memory 182 or by retrieving the application (or related data) from a remote database via an Internet connection. The processor 160 then writes a logic function (e.g., lookup map and touring matrix) stored in or associated with the application to the digital logic 170 to configure the system 100 for power, sense, and digital control channels needed to control the end effector 150.

In one implementation, each control card 140 can also include an identification circuit that outputs identification data for the control card 140. In one example, each control card 140 includes an integrated identification chip preloaded with a card UUID (e.g., an 8-bit UUID) and connected to a dedicated identification logic pad, to the ground pad, and to a dedicated low-current power supply pad. In this example, the dedicated identification logic pad on a control card 140 can interface with a logic pin in a component interconnect 130 connected directly to an input port on the processor 160, and the dedicated low-current power supply pad can interface with a second power supply pin in the component interconnect 130 connected to a second regulated power supply. On startup or when an end effector is first installed on the head 124, the system 100 can default to grounding all logic pins and supplying no power to the component interconnect 130 except for the second power supply pin in order to power only the integrated identification chip via the dedicated low-current power supply pad. As described above, the end effector 150 can include a similar identification circuit (as described above), and the head interface board 126, the component interconnect 130 (e.g., only the first component interconnect 130), and the control card 140 installed in the component interconnect 130 can similarly link the identification circuit in the end effector 150 to one or more I/O ports 162 on the processor 160. The processor 160 can then: read a card UUID from the integrated identification chip on the control card 140 via the dedicated identification logic pad; read an end effector UUID from the integrated identification chip in the end effector 150 type; confirm the control card 140 type for the installed end effector (e.g., based on end effector specifications stored in local memory 182 or stored in a remote database); retrieve a logic configuration (e.g., a lookup table and a routing matrix) for the digital logic 170 specific to the types of control cards 140 installed in the component interconnect 130 and to the end effector 150 installed on the head 124; and write the logic configuration to the digital logic 170 in order to connect select logic pads 146 in the component interconnects 130 to specific I/O ports 162 on the processor 160 and to set the state of each function circuit 143 on each control card 140 installed in the system 100. The processor 160 can thus automatically (re)configure the digital logic 170 and each installed control card 140 upon startup or when an end effector is replaced on the head 124.

The processor 160 can therefore collect card UUIDs and end effector UUIDs from control cards 140 and end effectors installed in component interconnects 130 and on the head 124, respectively, over time. The processor 160 can then match an end effector UUID to an end effector-specific application, such as by passing the end effector 150 UUID into a DNS, and can retrieve control card 140 requirements for the installed end effector accordingly. By comparing card UUIDs collected from installed control cards 140, the processor 160 can then confirm that the installed control cards 140 include all function circuits 143 required to manipulate the installed end effector. If the installed control cards 140 do not meet these requirements, the processor 160 can issue an error and prompt the user to install the correct control cards 140. Once the correct control cards 140 are installed, the processor 160 can upload the logic configuration for the end effector 150 onto the digital logic 170. The processor 160 can access the end effector 150-specific application and logic configuration from local memory 182 or can retrieve these data from a remote database, such as via an Internet connection. For example, when a user purchases a new end effector within the virtual marketplace, the platform can automatically push an application for the new end effector to the system 100, and the system 100 can store the application in local memory 182. Alternatively, when the user purchases the new end effector within the virtual marketplace, the platform can enable a system associated with the user's account to access the application for the new end effector; when the new end effector is installed on the head 124 and identified via a UUID, the processor 160 can download the application from the remote database and store this application in local memory 182 while the application is needed to manipulate the new end effector.

Once the digital logic 170 is configured and the application is loaded onto the system 100, the processor 160 can then execute functions supported by the application to manipulate the arm and the installed end effector. For example, when a grabber-type end effector is installed on the head 124, the processor 160 can load and execute a grabber application: to sample outputs of position sensors (e.g., optical encoders) at each powered axis in the arm and in the end effector 150—through I/O ports 162 in the processor 160 linked to sensors in the end effector 150 via the digital logic 170 and one or more control cards 140 installed in the base—over a record period; and to replay this recording at a later time by sampling positions sensors in the arm and end effector axes and implementing closed-loop feedback controls while powering actuators in each axis of the arm and end effector via power circuits on the one or more control cards 140.

However, the processor 160 can execute any function supported by an end effector-specific application when a corresponding end effector is installed on the head 124. The processor 160 can also cooperate with a remote computer system within the platform to perform the foregoing processes. Alternatively, the remote computer system can perform these processes remotely from the digital logic 170, the control cards 140, the arm, and/or the end effector 150 and communicate with these elements of the system 100 over a computer network, such as over the Internet.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

The invention claimed is:

1. A system comprising:
    a base;
    an arm extending from the base, comprising a set of articulable axes, and terminating in a head, the head comprising a head interface board defining a set of interface pins;
    a component interconnect arranged within the base, comprising a set of interconnect pins electrically coupled to the set of interface pins via a set of hookup wires, and comprising a set of logic pins;
    a first control card configured to transiently engage the component interconnect and comprising:
        a first set of interconnect pads configured to contact the set of interconnect pins,
        a first set of logic pads configured to contact the set of logic pins, and
        a first control circuit interposed between the first set of interconnect pads and the first set of logic pads and comprising a first set of independently-selectable function circuits between each interconnect pad in a subset of the first set of interconnect pads and corresponding logic pads in the first set of logic pads;
    a second control card configured to transiently engage the component interconnect in replacement of the first control card and comprising:
        a second set of interconnect pads configured to contact the set of interconnect pins,
        a second set of logic pads configured to contact the set of logic pins, and
        a first control circuit interposed between the second set of interconnect pads and the second set of logic pads and comprising a second set of independently-selectable function circuits between each interconnect pad in a subset of the second set of interconnect pads and corresponding logic pads in the second set of logic pads;
    a first end effector configured to transiently install on the head, comprising a first end effector interface board configured to electrically couple to the head interface board, configured to execute a first function, and comprising a first actuator and a first sensor electrically coupled to the first end effector interface board;
    a second end effector configured to transiently install on the head in replacement of the first end effector, comprising a second end effector interface board configured to electrically couple to the head interface board, configured to execute a second function different from the first function, and comprising a second actuator electrically coupled to the second end effector interface board;
    a processor arranged within the base, comprising a set of input/output ports, configured to identify a type of a control card loaded into the component interconnect and a type of an end effector installed on the head, and configured to retrieve a logic configuration based on the type of the control card and the type of the end effector; and
    a digital logic arranged within the base, comprising a set of logic-side ports electrically coupled to the logic pins in the component interconnect, comprising a set of processor-side ports connected to the input/output ports in the processor, and configured to electrically couple select logic-side ports in the set of logic-side ports to select processor-side ports in the set of processor-side ports based on the logic configuration received from the processor.

2. The system of claim 1:
    further comprising a third end effector configured to transiently install on the head in replacement of the first end effector, comprising a third end effector interface board configured to electrically couple to the head interface board, configured to execute a third function different from the first function and the second function, and comprising a third actuator electrically coupled to the third end effector interface board;

wherein the processor is further configured to:
navigate the arm through a first motion path and to trigger the first end effector to execute the first function via the first control card when the first end effector is installed on the head and the first processor is loaded into the component interconnect;
navigate the arm through a second motion path and to trigger the second end effector to execute the second function via the first control card when the second end effector is installed on the head and the first processor is loaded into the component interconnect; and
navigate the arm through a third motion path and to trigger the third end effector to execute the third function via the second control card when the third end effector is installed on the head and the second processor is loaded into the component interconnect.

3. The system of claim 2:
wherein the first end effector comprises a screw driver actuated and positioned by the first actuator;
wherein the second end effector comprises a pick-and-place interface actuated by the second actuator;
wherein the third end effector comprises a gripper actuated by the third actuator;
wherein the first control card is configured to control actuation of the screw driver in the first end effector and the pick-and-place interface in the second end effector responsive to commands from the processor; and
wherein the second control card is configured to control actuation of the gripper in the third end effector responsive to commands from the processor.

4. The system of claim 1:
wherein the first end effector excludes control circuitry; and
wherein the first actuator in the first end effector is controlled by a control circuit in the first control card, loaded into the component interconnect, responsive to commands received from the processor when the first end effector is installed on the head.

5. The system of claim 1:
wherein the first end effector further comprises a first identification chip electrically coupled to the first end effector interface board; and
wherein the processor is configured to:
identify a first end effector type of the first end effector based on a first end effector identifier read from the first identification chip via the head interface board when the first end effector is installed on the head;
identify a first control card type of the first control card based on a first control card identifier read from the first control card via the component interconnect when the first control card is installed in the component interconnect;
load a first logic configuration for a combination of the first end effector and the first control card based on the first end effector type and the first control card type;
configure the digital logic according to the first logic configuration when the first end effector is installed on the head and when the first control card is installed in the component interconnect; and
control the set of articulable axes in the arm and the first end effector through the drive logic.

6. The system of claim 5, wherein the processor is configured to retrieve the first logic configuration for a combination of the first end effector and the first control card from a remote server, via a computer network, based on the first end effector type and the first control card type.

7. The system of claim 1:
wherein the first end effector comprises a polymer extruder;
wherein the first control card is configured to interface with the first end effector to heat and dispense polymer responsive to commands from the processor; and
wherein the processor is configured to:
access a first logic configuration for the first end effector and the first control card when the first end effector is installed on the head and when the first control card is installed in the component interconnect;
configure the digital logic according to the first logic configuration when the first end effector is installed on the head and when the first control card is installed in the component interconnect; and
control the set of articulable axes in the arm and the first end effector through the drive logic to print a second housing of the second end effector.

8. The system of claim 7:
wherein the processor is configured to control the set of articulable axes in the arm and control the first end effector through the drive logic to print the second housing of the second end effector in response to selection of the second end effector by a user at a virtual marketplace associated with the system;
wherein the second actuator of the second end effector is supplied to the user for assembly in the second housing in response to selection of the second end effector at the virtual marketplace; and
wherein the second control card is supplied to the user in response to selection of the second end effector at the virtual marketplace.

9. The system of claim 8:
wherein the second end effector interface board of the second end effector comprises a second identification chip electrically coupled to the first end effector interface board and is supplied to the user for assembly in the second housing in response to selection of the second end effector at the virtual marketplace;
wherein the processor is configured to:
identify a second end effector type of the second end effector based on a second end effector identifier read from the second identification chip via the head interface board when the second end effector is installed on the head;
identify a second control card type of the second control card based on a second control card identifier read from the second control card via the component interconnect when the second control card is installed in the component interconnect;
load a second logic configuration for a combination of the second end effector and the second control card from a remote database based on the second end effector type and the second control card type;
configure the digital logic according to the second logic configuration when the second end effector is installed on the head and when the second control card is installed in the component interconnect; and
control the set of articulable axes in the arm and the second end effector through the drive logic.

10. The system of claim 1:
further comprising:
a first application associated with the first end effector and stored in an application database;

a second application associated with the second end effector and stored in the application database;
wherein the processor is configured
access the first application when the first end effector is installed on the head;
control the set of articulable axes in the arm and the first actuator in the first end effector based on the first application when the first end effector is installed on the head;
access the second application when the second end effector is installed on the head; and
control the set of articulable axes in the arm and the second actuator in the second end effector based on the second application when the second end effector is installed on the head.

11. The system of claim 10:
wherein the first end effector further comprises a first identification chip electrically coupled to the first end effector interface board; and
wherein the processor is configured to:
identify a first end effector type of the first end effector based on a first end effector identifier read from the first identification chip via the head interface board when the first end effector is installed on the head; and
download the first application from the application database via a computer network in response to identifying the first end effector type.

12. The system of claim 1:
wherein the first control card is configured to supply a high-current power signal to the first actuator in the first end effector through a first subset of hookup wires in the set of hookup wires when the first end effector is installed on the head; and
wherein the second control card is configured to communicate with the second end effector via low-current data signals through the first subset of hookup wires in the set of hookup wires when the second end effector is installed on the head.

13. A system comprising:
a base;
an arm extending from the base, comprising a set of articulable axes, and terminating in a head comprising a head interface;
a first end effector configured to execute a first function, configured to transiently install on the head, comprising a first end effector interface configured to transiently couple to the head interface, and comprising a first identification package;
a second end effector configured to execute a second function different from the first function, configured to transiently install on the head in replacement of the first end effector, comprising a second end effector interface configured to transiently couple to the head interface, and comprising a second identification package;
control electronics arranged within the base, configured to distribute command signals to the set of articulable axes and the head interface, and configured to receive sensor signals from the set of articulable axes and the head interface; and
a processor:
arranged within the base;
configured to read a first identifier from the first identification package, to access a first logic configuration and a first application for controlling the set of articulable axes and the first end effector based on the first identifier, to configure the control electronics according to the first logic configuration, and to serve commands to the set of articulable axes and the first end effector via the control electronics according to the first application when the first end effector is installed on the head; and
configured to read a second identifier from the second identification package, to access a second logic configuration and a second application for controlling the set of articulable axes and the second end effector based on the second identifier, to reconfigure the control electronics according to the second logic configuration, and to serve commands to the set of articulable axes and the second end effector via the control electronics according to the second application when the second end effector is installed on the head.

14. The method of claim 13, wherein the processor:
retrieves the first logic configuration and the first application from a remote database via a computer network in response to installation of the first end effector on the head;
retrieves the second logic configuration and the second application from the remote database via the computer network in response to installation of the second end effector on the head.

15. The method of claim 13:
wherein the head interface defines a set of interface pins;
wherein the control electronics comprises a component interconnect arranged within the base, comprising a set of interconnect pins electrically coupled to the set of interface pins via a set of hookup wires, and comprising a set of logic pins;
further comprising:
a first control card configured to transiently engage the component interconnect and comprising:
a first set of interconnect pads configured to contact the set of interconnect pins,
a first set of logic pads configured to contact the set of logic pins, and
a first control circuit interposed between the first set of interconnect pads and the first set of logic pads and comprising a first set of independently-selectable function circuits between each interconnect pad in a subset of the first set of interconnect pads and corresponding logic pads in the first set of logic pads;
a second control card configured to transiently engage the component interconnect in replacement of the first control card and comprising:
a second set of interconnect pads configured to contact the set of interconnect pins,
a second set of logic pads configured to contact the set of logic pins, and
a first control circuit interposed between the second set of interconnect pads and the second set of logic pads and comprising a second set of independently-selectable function circuits between each interconnect pad in a subset of the second set of interconnect pads and corresponding logic pads in the second set of logic pads;
wherein the processor is configured to:
access the first logic configuration based on the first identifier of the first end effector and a first card identifier of the first control card when the first end effector is installed on the head and the first control card is installed in the component interconnect; and access the second logic configuration based on the second identifier of the second end effector and a second card identifier of the second control card when the second end effector is installed on the head and the second control card is installed in the component interconnect.

16. The method of claim 15:

wherein the processor further comprises a set of input/output ports;

wherein the control electronics further comprises a digital logic:
- arranged within the base,
- comprising a set of logic-side ports electrically coupled to the logic pins in the component interconnect, and
- comprising a set of processor-side ports connected to the input/output ports in the processor; and wherein the processor:
- loads the first logic configuration onto the digital logic to trigger the digital logic to electrically couple a first subset of logic-side ports in the set of logic-side ports to a first subset of processor-side ports in the set of processor-side ports when the first end effector is installed on the head and the first control card is installed in the component interconnect; and
- loads the second logic configuration onto the digital logic to trigger the digital logic to electrically couple a second subset of logic-side ports in the set of logic-side ports to a second subset of processor-side ports in the set of processor-side ports when the second end effector is installed on the head and the second control card is installed in the component interconnect.

17. The method of claim 15:

wherein the first end effector comprises a pick-and-place interface actuated by a first actuator;

wherein the second end effector comprises a gripper actuated by a second actuator;

wherein the first control card is configured to control actuation of the pick-and-place interface by the first actuator in the first end effector responsive to commands from the processor; and wherein the second control card is configured to control actuation of the gripper by the second actuator in the second end effector responsive to commands from the processor.

18. The system of claim 13, wherein the first end effector:

excludes control circuitry; and comprises a first actuator controlled by the control electronics according to the first logic configuration responsive to commands received from the processor according to the first application when the first end effector is installed on the head.

19. The method of claim 13, wherein the processor is further configured to:

navigate the arm through a first motion path and to trigger the first end effector to execute the first function when the first end effector is installed on the head by:
- generating a first set of commands based on the first application; and
- serving the first set of commands to the control logic for distribution to the set of articulable axes and the first end effector according to the first logic configuration; and navigate the arm through a second motion path and to trigger the second end effector to execute the second function when the second end effector is installed on the head by:
- generating a second set of commands based on the second application; and
- serving the second set of commands to the control logic for distribution to the set of articulable axes and the second end effector according to the second logic configuration.

20. The system of claim 13:

further comprising a set of hookup wires extending through the arm between the control electronics in the base and the head interface;

wherein the control electronics is configured to supply a high-current power signal to a first actuator in the first end effector through a first subset of hookup wires in the set of hookup wires when the first end effector is installed on the head; and wherein the control electronics is configured to communicate with the second end effector via low-current data signals through the first subset of hookup wires in the set of hookup wires when the second end effector is installed on the head.

* * * * *